(12) United States Patent
Yaginuma et al.

(10) Patent No.: US 9,305,251 B2
(45) Date of Patent: Apr. 5, 2016

(54) IMAGE PROCESSING APPARATUS AND COMPUTER READABLE STORAGE MEDIUM STORED WITH CONTROL PROGRAM OF IMAGE PROCESSING APPARATUS

(71) Applicants: Shigeru Yaginuma, Tokyo (JP); Tetsuhiro Kodera, Saitama (JP); Kazuto Yamamoto, Tokyo (JP); Takeshi Ikusawa, Tokyo (JP); Tomoko Yamamoto, Tokyo (JP)

(72) Inventors: Shigeru Yaginuma, Tokyo (JP); Tetsuhiro Kodera, Saitama (JP); Kazuto Yamamoto, Tokyo (JP); Takeshi Ikusawa, Tokyo (JP); Tomoko Yamamoto, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/095,917

(22) Filed: Dec. 3, 2013

(65) Prior Publication Data
US 2014/0153057 A1    Jun. 5, 2014

(30) Foreign Application Priority Data
Dec. 4, 2012 (JP) .................................. 2012-265517

(51) Int. Cl.
*H04N 1/405*     (2006.01)
*G06K 15/02*     (2006.01)

(52) U.S. Cl.
CPC ........ *G06K 15/1878* (2013.01); *G06K 15/1825* (2013.01)

(58) Field of Classification Search
CPC ............ G06K 9/00456; G06K 15/107; G06K 15/1825; H04N 1/4092; H04N 13/0203; G06T 7/0085; G06T 11/40; G06T 7/0028
USPC ......................... 358/3.26–3.27, 3.21, 2.1, 1.5, 358/1.16–1.18, 450, 540; 382/212–216, 382/294–295, 291, 302–308, 173, 178
See application file for complete search history.

(56) References Cited

U.S. PATENT DOCUMENTS

| 5,953,019 A | 9/1999 | Shimakawa et al. |
| 6,785,427 B1 * | 8/2004 | Zhou ............................. 382/294 |

(Continued)

FOREIGN PATENT DOCUMENTS

| CN | 1933541 A | 3/2007 |
| JP | 07-073287 | 3/1995 |

(Continued)

OTHER PUBLICATIONS

Notification of Reason for Refusal for appl. No. 2012-265517, dispatched Dec. 24, 2014, 3 pgs.

(Continued)

*Primary Examiner* — Thomas D Lee
*Assistant Examiner* — Stephen M Brinich
(74) *Attorney, Agent, or Firm* — Squire Patton Boggs (US) LLP

(57) ABSTRACT

An image processing apparatus (1) according to the present invention includes a layer combining unit (11*a*) that generates a print image based on print data including a plurality of layers, a determining unit (11*b*) that determines whether objects included in different layers overlap each other in a single pixel constituting the print image, and a selecting unit (11*c*) that selects image processing to be performed with respect to the single pixel according to a combination of attribute information for each of the layers assigned to the single pixel, when the objects overlap each other in the corresponding single pixel.

14 Claims, 7 Drawing Sheets

(56) References Cited

U.S. PATENT DOCUMENTS

| | | | |
|---|---|---|---|
| 2003/0046655 A1* | 3/2003 | Kimura | ............................ 716/19 |
| 2005/0046635 A1 | 3/2005 | Honme | |
| 2006/0268311 A1 | 11/2006 | Tamaru | |
| 2012/0163732 A1* | 6/2012 | Hoshino et al. | ............... 382/284 |

FOREIGN PATENT DOCUMENTS

| | | |
|---|---|---|
| JP | 09-288477 | 11/1997 |
| JP | 2004-009421 | 1/2004 |
| JP | 2005-077522 | 3/2005 |
| JP | 2005-102130 | 4/2005 |
| JP | 2005-252485 | 9/2005 |
| JP | 2006-333213 | 12/2006 |
| JP | 2007-082145 | 3/2007 |
| JP | 2007-288349 | 11/2007 |
| JP | 2009-282716 | 12/2009 |

OTHER PUBLICATIONS

Translation of the Notification of Reason for Refusal for appl. No. 2012-265517, dispatched Dec. 24, 2014, 3 pgs.

Chinese Office Action for China patent application No. 201310645720.9 mailed Dec. 1, 2015, 6 pages.

Translation of Chinese Office Action for China patent application No. 201310645720.9 mailed Dec. 1, 2015, 7 pages.

* cited by examiner

FIG.4

| C7 | C6 | C5 | C4 | C3 | C2 | C1 | C0 |
|----|----|----|----|----|----|----|----|
| M7 | M6 | M5 | M4 | M3 | M2 | M1 | M0 |
| Y7 | Y6 | Y5 | Y4 | Y3 | Y2 | Y1 | Y0 |
| K7 | K6 | K5 | K4 | K3 | K2 | K1 | K0 |
| x value ||||||||

| b | i | v | t |
|---|---|---|---|
| z value ||||

FIG.5

| C7 | C6 | C5 | C4 | C3 | C2 | C1 | t |
|----|----|----|----|----|----|----|----|
| M7 | M6 | M5 | M4 | M3 | M2 | M1 | v |
| Y7 | Y6 | Y5 | Y4 | Y3 | Y2 | Y1 | i |
| K7 | K6 | K5 | K4 | K3 | K2 | K1 | b |
| x value ||||||| z value |

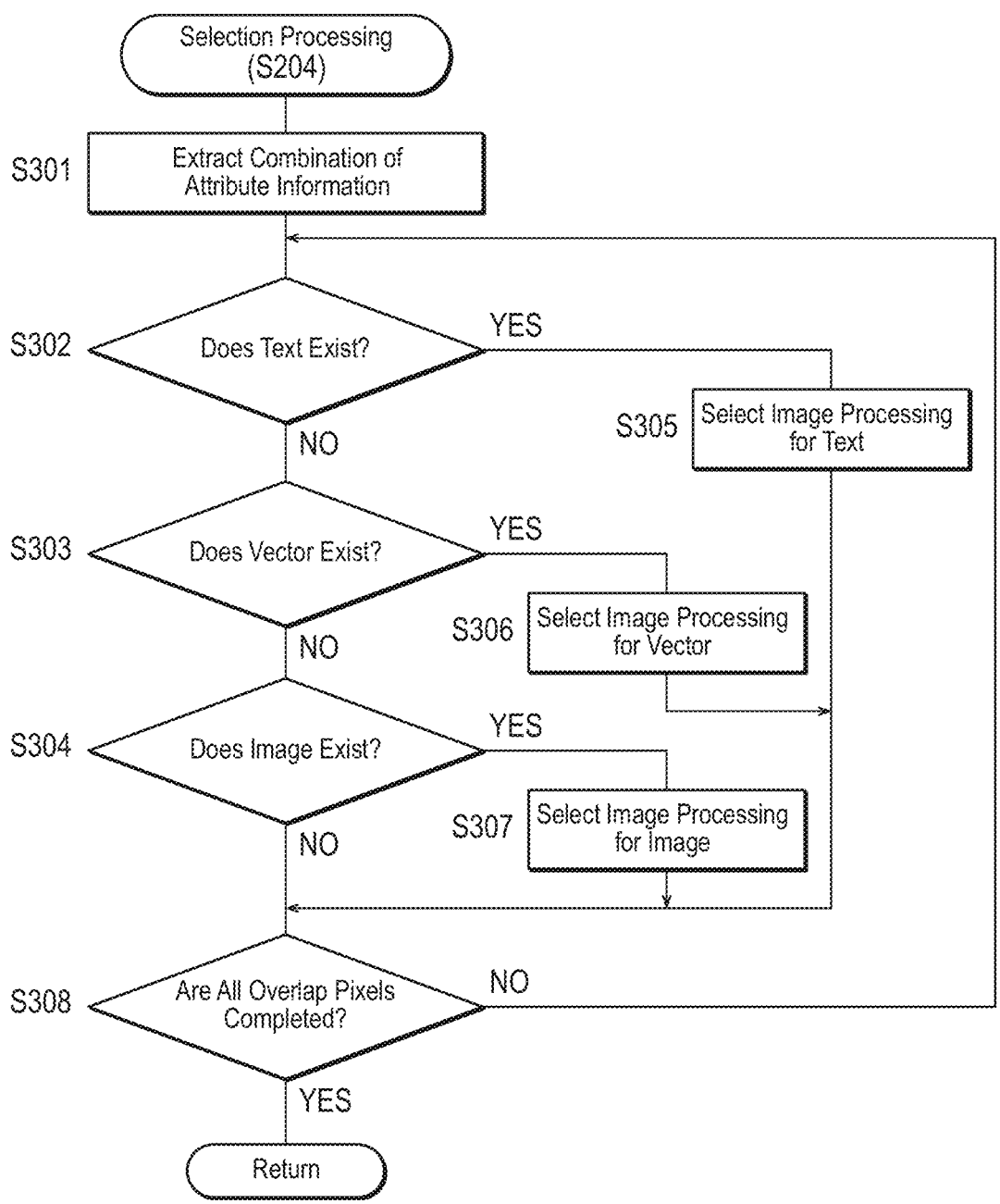

IMAGE PROCESSING APPARATUS AND COMPUTER READABLE STORAGE MEDIUM STORED WITH CONTROL PROGRAM OF IMAGE PROCESSING APPARATUS

CROSS-REFERENCE TO RELATED APPLICATION

This application is based on Japanese Patent Application No. 2012-265517 filed on Dec. 4, 2012, the contents of which are incorporated herein by reference.

BACKGROUND

1. Technical Field

The present invention provides an image processing apparatus that generates a print image based on print data including a plurality of layers, and a computer readable storage medium stored with a control program of the image processing apparatus.

2. Description of Related Art

In the past, when a single display image is generated by combining objects drawn in a plurality of layers, a method has been employed in which priorities of object units are preset and objects are overlapped so as to preferentially display objects having higher priority (see the Japanese unexamined patent application publication No. Hei9-288477, and No. Hei7-73287). In this regard, the Japanese unexamined patent application publication No. 2005-77522, and No. 2009-282716 propose a technology that generates a display image in consideration of transparency of each layer when objects drawn in different layers overlap each other. The Japanese unexamined patent application publication No. 2004-9421 proposes a technology that when a template print based on an image captured by a digital camera is performed, transparency information (mask pattern) is set to a template image including a frame or "emoji", etc., and the captured image and the template image are combined according to the transparency information.

By the way, when print processing of image data including a plurality of layers is performed, optimization processing (for example, thinning processing or edge enhancement processing) according to an attribute of each pixel is preferably performed. According to the conventional method, there is a problem in that objects of layers located at lower layers are not appropriately represented because only attribute information of the uppermost layer is referred to with respect to the pixel in which objects of different layers overlap each other. For example, when the uppermost layer corresponding to a certain pixel is a translucent image and a next layer is a text, an image object is subjected to optimization processing, but a text object is excluded from the optimization processing. Therefore, the image quality of the text object is relatively degraded.

SUMMARY

The present invention has been made in consideration of the problems of the prior art, and an object of the present invention is to provide an image processing apparatus and a control program of the image processing apparatus which are capable of preventing a relative degradation of print quality of objects included in lower layers with respect to print quality of objects included in the uppermost layers, when outputting a print image based on print data including a plurality of layers.

To achieve at least one of the abovementioned objects, an information processing apparatus reflecting one aspect of the present invention comprises the following.

An image processing apparatus for generating a print image based on print data including a plurality of layers, the image processing apparatus comprising a determining unit that determines whether objects included in different layers overlap each other in a single pixel constituting said print image, and a selecting unit that selects image processing to be performed with respect to said single pixel according to a combination of attribute information for each of said layers assigned to said single pixel, when said determining unit determines that the objects overlap each other.

It is preferable that the image processing to be performed with respect to said single pixel is screen processing performed in a print engine that outputs said print image.

It is preferable that the screen processing performed in said print engine includes at least one of thinning, edge enhancement, and smoothing.

It is preferable that said selecting unit refers to priorities preset to each of said attribute information included in said combination, and selects the image processing to be performed with respect to said single pixel according to said attribute information having the highest priority.

It is preferable that said selecting unit selects the image processing to be performed with respect to said single pixel according to a combination of said attribute information corresponding to at least the uppermost one and a next one of the said layers.

It is preferable that said attribute information includes at least one of information indicating a type of said object, information indicating an edge attribute of said object, and a type of screen processing applied to said object.

It is preferable that said selecting unit adjusts an intensity of the image processing to be performed with respect to said single pixel according to the number of overlapping of objects of said layers different from each other in said single pixel.

It is preferable that said layer is variable data that constitutes variable print data for generating a printed matter for a plurality of users, and said selecting unit selects image processing to be additionally performed with respect to said single pixel, based on said user's personal information extracted from an object included in said variable print data.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 4 is a schematic diagram illustrating an example of color information and attribute information of each pixel according to an embodiment of the present invention.

FIG. 5 is a schematic diagram illustrating another example of color information and attribute information of each pixel according to an embodiment of the present invention.

FIG. 9 is a flowchart illustrating a procedure of selection processing according to an embodiment of the present invention.

DETAILED DESCRIPTION

Hereinafter, embodiments of the present invention will be described in detail with reference to the drawings.

Figure 1:
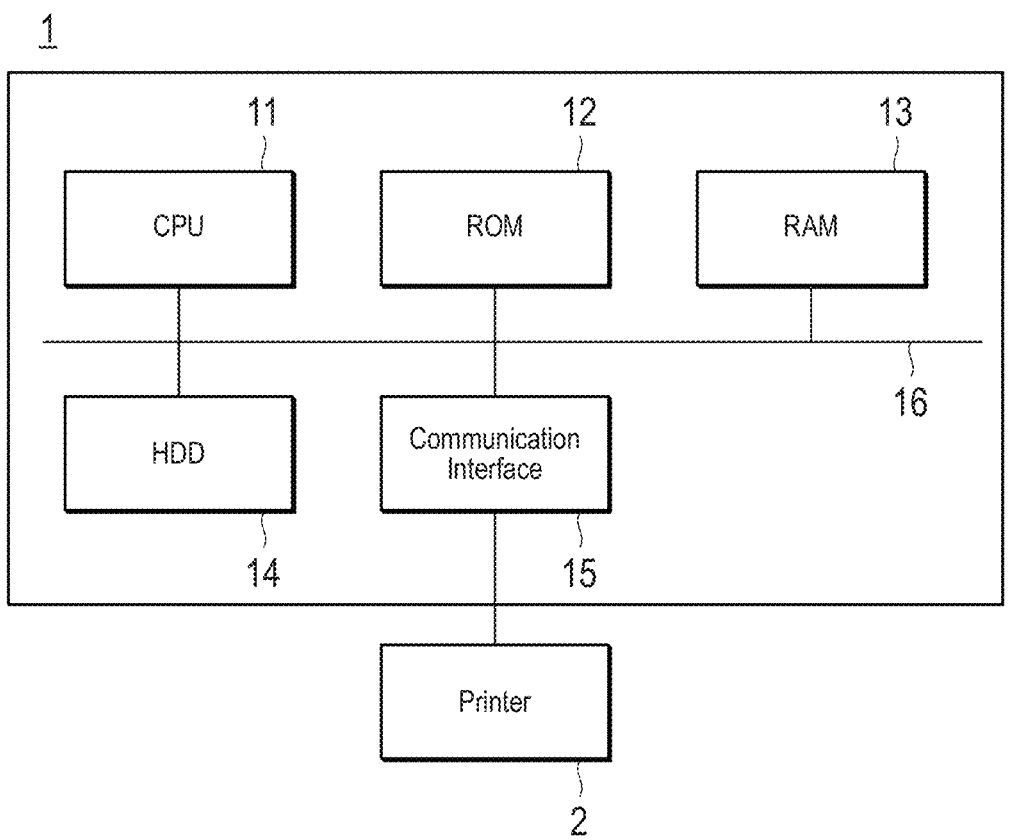
FIG. 1 is a block diagram illustrating a configuration of an image processing apparatus according to an embodiment of the present invention.

FIG. 1 is a block diagram illustrating a configuration of an image processing apparatus 1 according to an embodiment of the present invention. As illustrated in FIG. 1, the image processing apparatus 1 includes a CPU (central processing unit) 11, a ROM (read only memory) 12, a RAM (random access memory) 13, a HDD (hard disk drive) 14, and a communication interface 15, which are connected to one another through buses 16 for signal exchange. Details of the respective parts will be described below in sequence.

The CPU 11 is a device that executes a program stored in the ROM 12, and controls an overall operation of the image processing apparatus 1 by arithmetically processing data loaded on the RAM 13 according to an instruction of a control program. As described below, the CPU 11 has functions as a "layer combining unit 11a", an "overlap determining unit 11b", and a "selecting unit 11c" (see FIG. 6). The ROM 12 stores various data including the control program executed by the CPU 11.

The RAM 13 temporarily stores the control program or parameters as a work area of the CPU 11. As described below, the RAM 13 has a function as an image data storing unit 13a that temporarily stores various data in "rasterizing/rendering processing" and "layer combination processing" (see FIG. 6).

The HDD 14 is a storage device that stores an OS (operating system), which is basic software of the image processing apparatus 1, application programs related to the present embodiment, and/or plug-in for functional extension, together with associated data.

The communication interface 15 is an interface for connecting the image processing apparatus 1 to an external device, and is compliant with a communication standard such as Ethernet (registered trademark), token ring, or FDDI, etc. For example, the communication interface 15 is a communication device such as a NIC (network interface card). As illustrated in FIG. 1, the image processing apparatus 1 is connected to a printer 2 through the communication interface 15.

The printer 2 is a print engine that performs print processing based on image data received from the image processing apparatus 1. More specifically, the printer 2 outputs a print image based on image data by performing electrophotographic print processing including a charging process of charging a photosensitive drum, an exposure process of forming an electrostatic latent image on the photosensitive drum by a laser beam, a development process of developing a toner image by attaching a toner to the electrostatic latent image on the photosensitive drum, a transfer process of transferring the toner image on the photosensitive drum to a sheet by a transfer belt, and a fixing process of heating and fixing the toner image transferred to the sheet by a fixing roller. However, a printing method employed by the printer 2 may be another method such as an impact method, a thermal transfer method, or an inkjet method.

Also, the printer 2 according to the present embodiment has a function that performs special screen processing such as "thinning", "edge enhancement", and "smoothing" with respect to each pixel of image data for print processing. The printer 2 may be a device independent from the image processing apparatus 1 as illustrated in FIG. 1 or may be integrated into the image processing apparatus 1.

The image processing apparatus 1 having the above configuration generates image data of a format processable in the printer 2 side by performing the "rasterizing/rendering processing" and the "layer combination processing" with respect to print data described in a PDL (page description language) such as Postscript (registered trademark).

Figure 2:
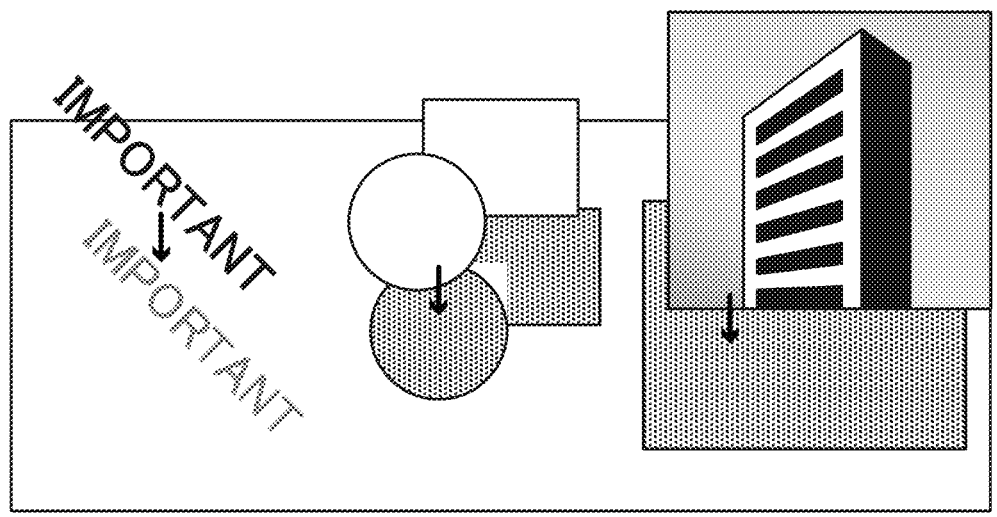
FIG. 2 is a schematic diagram illustrating a configuration of print data according to an embodiment of the present invention.

FIG. 2 is a schematic diagram illustrating a configuration of print data according to an embodiment of the present invention. As illustrated in FIG. 2, the print data according to the present embodiment is composed of a plurality of independent layers, and each of the layers includes one or more objects composed of a text, an image, or a figure, etc. The image processing apparatus 1 generates image data for each layer by performing the "rasterizing/rending processing" with respect to the object of each layer, and by performing the "layer combination processing" with respect to the image data, the image processing apparatus 1 generates image data for print processing. Details of these types of processing will be described below.

Note that, in general, the "rasterizing" refers to processing of converting data of a vector format constituting print data into data of a raster format, and the "rendering" refers to processing of generating image data for print processing, based on the data of the raster format. In the image processing apparatus 1 according to the present embodiment, the rasterizing and the rendering with respect to the print data are regarded as one processing. Therefore, in the present embodiment, the two types of processing are collectively referred to as "rasterizing/rendering" processing.

Figure 3:
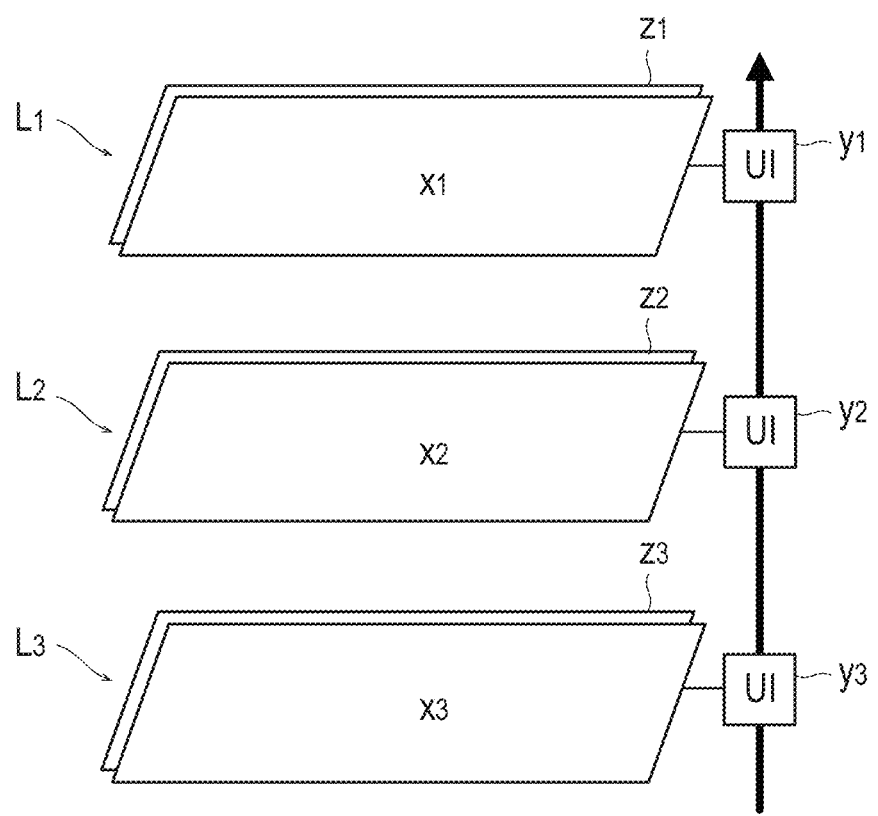
FIG. 3 is a schematic diagram illustrating a configuration of image data for each layer generated by rasterizing/rendering processing according to an embodiment of the present invention.

FIG. 3 is a schematic diagram illustrating a configuration of image data for each layer generated by the rasterizing/rendering process. As illustrated in FIG. 3, during the rasterizing/rendering processing, color information (values of $x_1$ to $x_3$ in the drawing) and attribute information (values of $z_1$ to $z_3$ in the drawing) of each pixel are calculated with respect to the respective layers $L_1$ to $L_3$ constituting the print data. In the present embodiment, the color information refers to a color value represented by a color specification system such as CMYK or RGB.

Also, in the present embodiment, the attribute information is parameters related to the print processing, such as an object tag, an edge tag, screen information, and toner limiter information. The object tag used herein is tag information indicating a type of the object included in each layer. For example, the object tag is tag information including four types of variables: a character (text), an image, a figure (vector), and a blank. The edge tag is tag information indicating whether a relevant pixel corresponds to an edge portion of an object included in each layer. The screen information is tag information indicating a type of screen processing performed with respect to the relevant pixel by the image processing apparatus 1 side. The toner limiter information is tag information indicating whether to locally release a toner limiter, which is set in the printer 2 side, in the relevant pixel.

The object tag and the edge tag described above are calculated from a variety of information embedded in the print data. Also, the screen information and the toner limiter information are calculated based on user setting information such as a driver property, etc. The color information and the attribute information calculated in the above manner is stored in the image data storing unit 13a of the RAM 13 prior to the layer combination processing to be described below (see FIG. 6).

FIG. 4 is a schematic diagram illustrating an example of color information (x value) and attribute information (z value) of each pixel, which are calculated by the rasterizing/rendering processing. The color information according to the present example is represented by a bit string of a total thirty-two bits in which each color of the CMYK is assigned with eight bits. Also, the attribute information according to the present example is an object tag including four types of variables: an image (i), a text (t), a vector (v), and a blank (b). The object tag is represented by a bit string of a total four bits in which each variable is assigned with one bit.

FIG. 5 is a schematic diagram illustrating another example of color information (x value) and attribute information (z value) of each pixel. The color information according to the present example is represented by a bit string of a total twenty-eight bits in which each color of the CMYK is assigned with seven bits, and the attribute information is represented by a bit string of a total four bits same as in FIG. 4. Although this arrangement slightly reduces gradation of the image data, the color information and the attribution information can be represented by a bit string of a total thirty-two bits.

Also, in order to reduce data amount of the attribute information (z value), the image/blank and the text/vector having relatively approximate characteristics among object attributes may be grouped, respectively. Therefore, the attribute information can be represented by a bit string of total two bits. Also, the attribute information according to the examples of FIGS. 4 and 5 includes only the object tags, but the present embodiment can employ attribute information including only other parameters, such as the edge tag or the screen information, and may employ attribute information including a combination of the object tags and other parameters.

Referring again to FIG. 3, during the rasterizing/rendering processing with respect to the print data, transparency information ($y_1$ to $y_3$) of the respective layers ($L_1$ to $L_3$) constituting the print data are acquired. The transmittance information in the present embodiment is an index that indicates how much the layer allows the object located thereunder to penetrate the layer, and is represented by a value from 0 to 1 (0% to 100%).

As illustrated in FIG. 3, transmittance information ($y_1$ to $y_3$) of the respective layers is acquired through a user interface (UI). The user interface used herein is, for example, a printer driver. However, the transmittance information may be calculated from a variety of information embedded in the print data, and may be preset in the image processing apparatus 1 side. In the latter case, the preset value of the transmittance information may be a fixed value or a sequentially updatable value. The layer transparency information ($y_1$ to $y_3$) calculated in the above manner is stored in the image data storing unit 13a of the RAM 13 prior to the layer combination processing to be described below (see FIG. 6).

Figure 6:
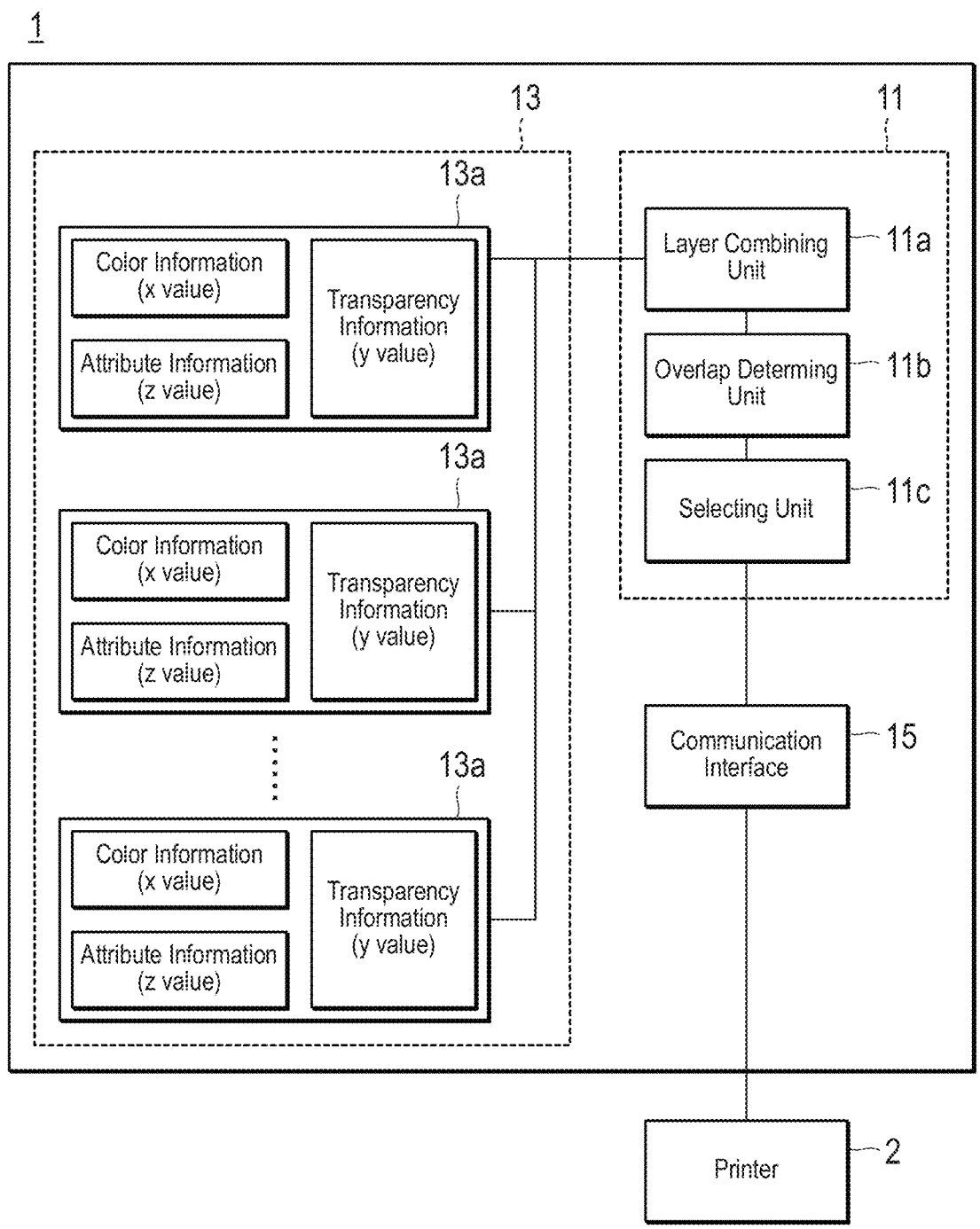
FIG. 6 is a block diagram conceptually illustrating a function of each unit of an image processing apparatus according to an embodiment of the present invention.

FIG. 6 is a block diagram conceptually illustrating a function of each unit of the image processing apparatus 1 in the layer combination processing. As illustrated in FIG. 6, the RAM 13 has a function as a plurality of image data storing units 13a independent of one another. The respective image data storing units 13a correspond to the respective layers constituting the print data, and store the transparency information (y value) for each layer, in addition to the color information (x value) and the attribute information (z value) of each pixel.

Also, the CPU 11 has the functions as the layer combining unit 11a, the overlap determining unit 11b, and the selecting unit 11c. The layer combining unit 11a generates image data for print processing by overlapping the layers constituting the print data with each other. The overlap determining unit 11b determines whether objects of different layers overlap each other in each pixel constituting the image data. The pixel in which the objects overlap each other is referred to as an "overlap pixel". The selecting unit 11c selects a type of image processing to be performed with respect to each overlap pixel in the printer 2 side. Detailed operations of the layer combining unit 11a, the overlap determining unit 11b, and the selecting unit 11c will be further described below.

Figure 7:
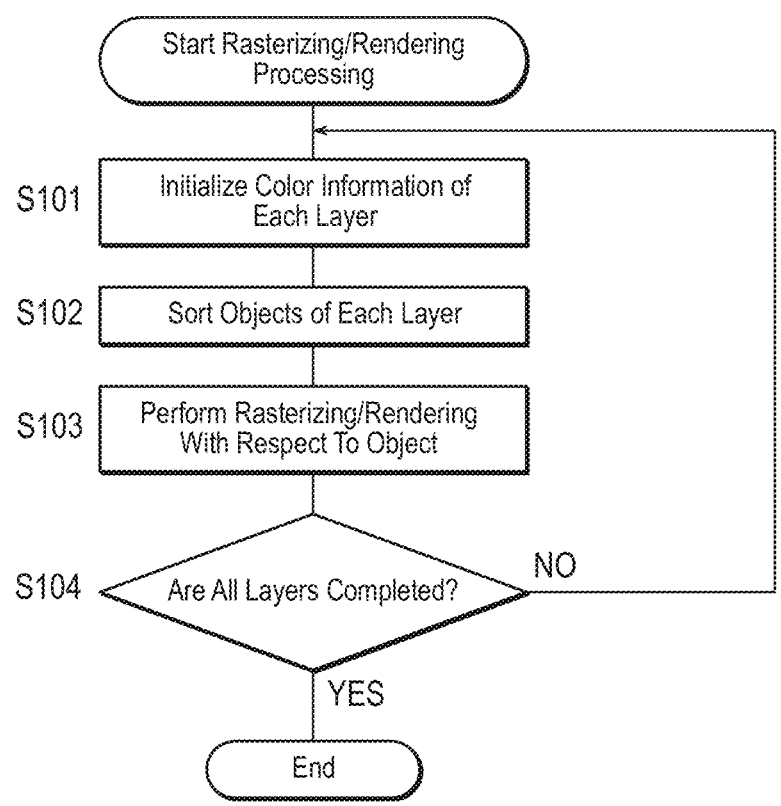
FIG. 7 is a flowchart illustrating a procedure of rasterizing/rendering processing according to an embodiment of the present invention.

Next, the outline of the operation of the image processing apparatus 1 according to the present embodiment will be described. FIG. 7 is a flowchart illustrating a procedure of the rasterizing/rendering processing according to the present embodiment. The algorithm illustrated by the flowchart of FIG. 7 is stored in the ROM 12 or the HDD 14 as a control program.

As illustrated in FIG. 7, first, the image processing apparatus 1 initializes color information of all pixels of the uppermost layer (S101). More specifically, in S101, the x values of all pixels of the uppermost layer are set to zero. Subsequently, the image processing apparatus 1 sorts objects to be drawn in the uppermost layer in a predetermined order (S102), and performs rasterizing and rendering with respect to the objects (S103).

For example, the image processing apparatus 1 sorts objects such that an object to be disposed on a lower layer side in the uppermost layer is first processed. In this manner, the color information (x value) and the attribute information (z value) corresponding to each pixel constituting the uppermost layer are calculated, and the transparency information (y value) corresponding to the uppermost layer is acquired. These pieces of information are stored in the image data storing unit 13a of each layer.

Subsequently, the image processing apparatus 1 repeats steps of the processing in S101 to S103 with respect to the other layers of the print data (NO in S104). When the image processing apparatus 1 performs the steps of processing in S101 to S103 with respect to all layers (YES in S104), the image processing apparatus 1 ends the rasterizing/rendering processing of the print data (END).

Figure 8:
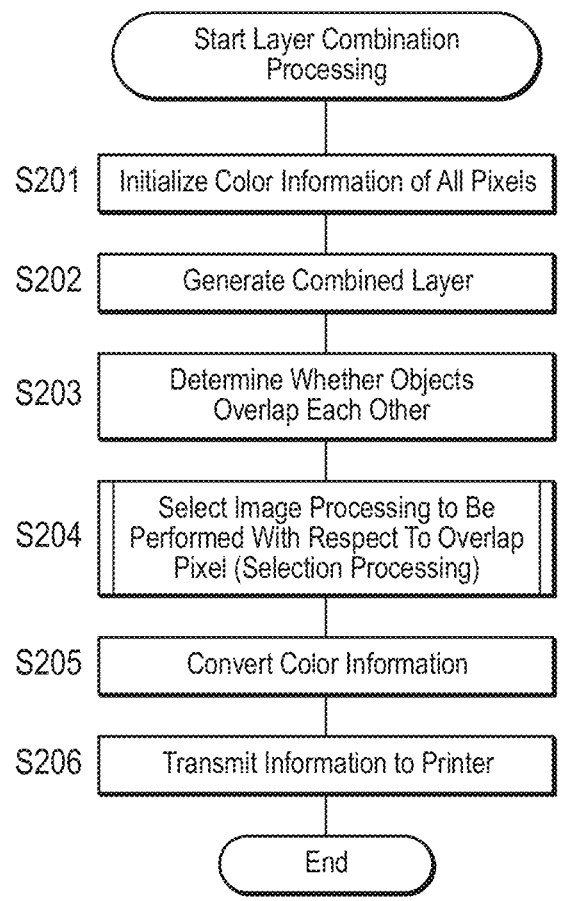
FIG. 8 is a flowchart illustrating a procedure of layer combination processing according to an embodiment of the present invention.

FIG. 8 is a flowchart illustrating a procedure of the layer combination processing according to the present embodiment. The algorithm illustrated by the flowchart of FIG. 8 is stored in the ROM 12 or the HDD 14 as a control program. In the layer combination processing according to the present embodiment, the image data for print processing is generated by overlapping the lower layers in order on the uppermost layer. Also, the image data generated by overlapping the respective layers in order is referred to as a "combined layer" for convenience.

As illustrated in FIG. 8, the image processing apparatus 1 initializes color information of all pixels of the combined layer (S201). More specifically, in S201, the x values of all pixels of the combined layer are set to zero. Subsequently, the image processing apparatus 1 generates the combined layer by overlapping the lower layers in order on the upper layer (S202). More specifically, in S202, color information of the respective pixels of the combined layer is calculated from color information of the respective pixels that is stored in the respective image data storing units 13*a*. This procedure is performed by the above-described layer combining unit 11*a*.

For example, when the lower layers are overlapped on the upper layer, the layer combining unit 11*a* calculates color information ($C_p$, $M_p$, $Y_p$, $K_p$) of each pixel of the combined layer by using the following Equation 1.

$$C_p = (C_f + C_b)/2 + \Delta C \cdot y$$

$$M_p = (M_f + M_b)/2 + \Delta M \cdot y$$

$$Y_p = (Y_f + Y_b)/2 + \Delta Y \cdot y$$

$$K_p = (K_f + K_b)/2 + \Delta K \cdot y \quad \text{[Equation 1]}$$

In Equation 1, ($C_f$, $M_f$, $Y_f$, $K_f$) is color information of the upper layer, and ($C_b$, $M_b$, $Y_b$, $K_b$) is color information of the lower layer. Also, y is the transmittance of the upper layer (0<y<1). In Equation 1, the values of $\Delta C$, $\Delta M$, $\Delta Y$ and $\Delta K$ are given by the following Equation 2.

$$\Delta C = |C_f - C_b|$$

$$\Delta M = |M_f - M_b|$$

$$\Delta Y = |Y_f - Y_b|$$

$$\Delta K = |K_f - K_b| \quad \text{[Equation 2]}$$

However, when the transmittance y of the upper layer is 1 (y=1), that is, when the upper layer is completely transparent, the color information ($C_b$, $M_b$, $Y_b$, $K_b$) of the lower layer is directly employed as the color information ($C_p$, $M_p$, $Y_p$, $K_p$) of the combined layer. When the transmittance y of the upper layer is 0 (y=0), that is, when the upper layer is completely opaque, the color information ($C_f$, $M_f$, $Y_f$, $K_f$) of the upper layer is directly employed as the color information ($C_p$, $M_p$, $Y_p$, $K_p$) of the combined layer.

When three or more layers are included in the print data (see FIG. 3), color information of a combined layer when further lower layers are overlapped is calculated by replacing the color information ($C_f$, $M_f$, $Y_f$, $K_f$) of the upper layer with the color information ($C_p$, $M_p$, $Y_p$, $K_p$) of the combined layer in Equation 1 above. By repeating such calculation until the lowermost layer, color information of a final combined layer (that is, image data for print processing) is calculated.

Subsequently, the image processing apparatus 1 determines whether objects of different layers overlap each other in each pixel constituting the image data for print processing (S203). More specifically, in S203, a combination ($z_1$, $z_2$, $z_3$) of attribute information of each layer stored in the above-described image data storing unit 13*a* is extracted in each pixel, and it is determined whether two or more attributes other than "blank" are included in the combination. This procedure is performed by the above-described overlap determining unit 11*b*.

When two or more attributes other than "blank" are included in the combination of the attribution information, objects of different layers are overlapped with each other in the pixel. Hereinafter, such a pixel is referred to as an "overlap pixel". On the other hand, when only one attribute other than the blank is included, or when no attribute other than the blank is included, the pixel is not an overlap pixel.

Subsequently, the image processing apparatus 1 selects a type of image processing to be performed in the printer 2 side with respect to each pixel determined as the overlap pixel in S203 (S204). More specifically, in S204, a combination of attribution information for the layer of each overlap pixel is referred to, and optimal image processing based on the combination is selected. Hereinafter, the procedure of S204 is referred to as "selection processing". The selection processing is performed by the above-described selecting unit 11*c*. A detailed procedure of the selection processing will be described below (see FIG. 9). The procedures of S203 and S204 may be performed in parallel with the procedure of S202, or may be performed before S202.

Subsequently, the image processing apparatus 1 converts the color information of the combined layer generated in S202 (that is, the image data for print processing) into a format processable in the printer 2 side (S205). In this step, when a calibration or a tone curve adjustment has been performed in the printer driver, color information to which conversion coefficients thereof are added is calculated. Subsequently, the image processing apparatus 1 transmits the color information converted in S205 and the information indicating the type of the image processing selected in S204 to the printer 2 (S206), and ends the layer combination processing (End).

Subsequently, the printer 2 performs print processing based on the image data received from the image processing apparatus 1. At this time, the printer 2 performs the image processing selected in S204 with respect to the respective overlap pixels. On the other hand, the image processing based on the attribute information of the uppermost layer is performed as usual with respect to pixels other than the overlap pixels. The image processing used herein includes a screen change or a toner limiter release as well as special screen processing such as thinning, edge enhancement, and smoothing.

The screen change used herein refers to replacing the screen processing performed in the image processing apparatus 1 side with other type of screen processing. Also, the toner limiter release refers to locally releasing the toner limiter set in the printer 2 side.

FIG. 9 is a flowchart illustrating a detailed procedure of the above-described selection processing (S204). First, the image processing apparatus 1 extracts the combination (for example, $z_1$, $z_2$, and $z_3$ in FIG. 6) of the attribute information for each layer of each overlap pixel from the above-described image data storing units 13*a* (S301).

Subsequently, the image processing apparatus 1 determines whether a "text" is included in the combination of the attribute information extracted in S301 (S302). When the "text" is included (YES in S302), image processing for text object is selected as the image processing to be performed with respect to the overlap pixel (S305). The image processing for the text object used herein is, for example, text thinning or text edge enhancement. Subsequently, the image processing apparatus 1 proceeds to a procedure of S308 to be described below.

On the other hand, when the "text" is not included in the combination of the attribute information extracted in S301 (NO in S302), it is additionally determined whether a "vector" is included in the combination (S303). When the "vector" is included (YES in S303), image processing for vector object is selected as the image processing to be performed with respect to the overlap pixel (S306). The image processing for the vector object used herein is, for example, line smoothing. Subsequently, the image processing apparatus 1 proceeds to a procedure of S308 to be described below.

On the other hand, when neither the "text" not the "vector" is included in the combination of the attribute information extracted in S301 (NO in S303), it is additionally determined whether an "image" is included in the combination (S304). When the "image" is included (YES in S304), image processing for image object is selected as the image processing to be performed with respect to the overlap pixel (S307). The image processing for the image object used herein is, for example, image smoothing. Subsequently, the image processing apparatus 1 proceeds to a procedure of S308 to be described below.

Subsequently, the image processing apparatus 1 repeats the procedures of S302 to S304 with respect to the other overlap pixels (NO in S308). When the image processing apparatus 1 performs the procedures of S302 to S304 with respect to all overlap pixels (YES in S308), the image processing apparatus 1 ends the image-processing selection processing (End). Also note that, the image processing apparatus 1 may count the number of overlapping of the objects in each overlap pixel with reference to the combination of the attribute information extracted in S301. An intensity of the image processing to be applied to each pixel may be adjusted according to the number of overlapping of the objects in each overlap pixel.

As described above, in the example of the flowchart of FIG. 9, priorities are assigned to four types of object tags including the text, the image, the vector, and the blank, as shown in Table 1 below. The image processing suitable for the object having the highest priority among the objects included in the combination extracted in S301 is selected as the image processing to be performed with respect to the corresponding pixel.

TABLE 1

| Object Tag | Priority |
| --- | --- |
| Text | 1 |
| Vector | 2 |
| Image | 3 |
| Blank | 4 |

However, the method of selecting the image processing to be performed with respect to the overlap pixel is not limited to the examples of FIG. 9 and Table 1, and the image processing apparatus 1 can employ various selecting methods according to the combination of the attribute information for each layer. For example, a reference table indicating all combinations of attribute information for each layer and the type of the image processing suitable for each combination may be previously prepared, and the type of the image processing to be performed with respect to the overlap pixel may be selected according to the reference table. The method of selecting the image processing according to the present example will be described with reference to Table 2 below.

Table 2 below is an example of the reference table indicating all combinations of attribute information of a first layer and a second layer and the type of the image processing suitable for each combination. In the reference table, the first column and the second column indicate all combinations of attribute information of the first layer and the second layer of the print data, and the third column indicates the type of the image processing suitable for each combination. The first layer used herein refers to the uppermost layer, and the second layer used herein refers to a layer next to the uppermost layer.

TABLE 2

| First Layer | Second Layer | Suitable Image Processing |
| --- | --- | --- |
| Text | Text | Text thinning, Text edge enhancement |
| Text | Vector | Text thinning, Line smoothing |
| Text | Image | Text thinning, Text edge enhancement |
| Text | Blank | Text thinning, Text edge enhancement |
| Vector | Text | Text thinning, Line smoothing |
| Vector | Vector | Line smoothing |
| Vector | Image | Line smoothing |
| Vector | Blank | Line smoothing |
| Image | Text | Text thinning, Text edge enhancement |
| Image | Vector | Line smoothing |
| Image | Image | Image smoothing, Screen change |
| Image | Blank | Image smoothing |
| Blank | Text | Text thinning, Text edge enhancement |
| Blank | Vector | Line smoothing |
| Blank | Image | Image smoothing |
| Blank | Blank | None |
| Text & Image | Text | Text thinning |
| Text & Image | Vector | Text thinning, Line smoothing |
| ... | ... | ... |
| ... | ... | ... |
| ... | ... | ... |

Although Table 2 above indicates only the combination of attribute information of two layers, a reference table indicating combinations of attribute information of three or more layers may be prepared when the print data is constituted by three or more layers. However, it should be noted that an amount of data processed by the selecting unit 11c is increased with an increase in the number of layers.

For example, considering that two or more types of objects may exist in each layer, when each layer is assigned with four bits, an amount of data necessary for representing all combinations of attribute information of two layers is eight bits. However, amounts of data necessary for representing all combinations of attribute information of three layers and four layers are increased to twelve bits and sixteen bits, respectively.

Also, in the above description, the object tag including four types, that is, the text, the image, the vector, and the blank, as the attribute information of each pixel of the print data has been employed, but the attribute information in the present embodiment may be image information such as the edge tag, the screen information, and the toner limiter information and may be a combination of the image information and the object tag.

However, when the screen information or the toner limiter information, etc. is employed as the attribute information, common attribute information may be defined with respect to each layer, instead of defining the attribute information of each pixel with respect to each layer, so as to reduce memory usage for various types of processing. Also, in the above description, common transparency information (y value) is defined with respect to each layer, but transparency information may be defined with respect to each pixel of each layer.

As described above, when objects included in different layers overlap each other in the pixel constituting the image data, the image processing apparatus 1 according to the present embodiment selects the type of the image processing to be performed with respect to the pixel, according to the combination of attribute information of each layer assigned to the pixel. Therefore, according to the image processing apparatus 1, a relative degradation of the print quality of the object included in the lower layer can be effectively prevented with respect to the print quality of the object included in the uppermost layer. For example, when the object of the uppermost layer is a translucent image object and the object of the next layer is a text object, appropriate image processing can be performed with respect to both the image object and the text object.

The present invention is not limited to the above embodiments, but various modifications can be made without departing from the scope of the present invention. For example, the print data according to the present invention may be variable print data for printing, for example, bills and specifications of credit card companies or direct mails for various advertisements. The variable print data has a customized part (variable data) whose contents are different for each user (recipient), and the customized part frequently includes a plurality of layers so as to store a plurality of information such as an address, name, and age of each user (recipient).

The image processing apparatus according to the present invention may extract user's personal information (for example, an address, name, age, and the like) from the objects included in each layer of the customized part, and select the image processing optimal to each user, based on the personal information. For example, when the text objects for aged persons are printed, the readability of the text may be improved by performing the edge enhancement. When the text objects for young women are printed, a soft image may be generated as a whole by performing smoothing. The image processing optimal to each user may be additionally performed with respect to the image processing selected according to the combination of attribution information (z value) for each layer, or may be performed instead of the corresponding image processing.

Each unit of the image processing apparatus according to the present invention may be realized by a dedicated hardware circuit for performing the above procedures, or may be realized by the CPU executing a program describing the above procedures. When the present invention is realized by the latter, the program operating each unit maybe provided by a non-transitory computer readable storage medium such as a floppy (registered trademark) disk or a CD-ROM, or may be provided online through the communication network such as the Internet. In this case, the program recorded in the non-transitory computer readable storage medium may be usually transmitted to the ROM or the HDD and stored therein. Also, the program may be provided as single application software or may be embedded into the image processing apparatus as one function of a device constituting the image processing apparatus.

What is claimed is:

1. An image processing apparatus for generating a print image based of print data including a plurality of layers, the image processing apparatus comprising:
    a determining unit that determines whether objects included in different layers overlap each other in a single pixel constituting said print image; and
    a selecting unit that selects, from a plurality of different image processing, an image processing to be performed with respect to said single pixel according to a combination of attribute information for each of said layers assigned to said single pixel, when said determining unit determines that the objects overlap each other,
    wherein said selecting unit adjusts an intensity of the image processing to be performed with respect to said single pixel according to the number of overlapping of objects of said layers different from each other in said single pixel.

2. The image processing apparatus as claimed in claim 1, wherein the image processing to be performed with respect to said single pixel is screen processing performed in a print engine that outputs said print image.

3. The image processing apparatus as claimed in claim 2, wherein the screen processing performed in said print engine includes at least one of thinning, edge enhancement, and smoothing.

4. The image processing apparatus as claimed in claim 1, wherein said selecting unit refers to priorities preset to each of said attribute information included in said combination, and selects, from the plurality of different image processing, the image processing to be performed with respect to said single pixel according to said attribute information having the highest priority.

5. The image processing apparatus as claimed in claim 1, wherein said selecting unit selects the image processing to be performed with respect to said single pixel according to a combination of said attribute information corresponding to at least the uppermost one and a next one of the said layers.

6. The image processing apparatus as claimed in claim 1, wherein said attribute information includes at least one of information indicating a type of said object, information indicating an edge attribute of said object, and a type of screen processing applied to said object.

7. An image processing apparatus for generating a print image based on print data including a plurality of layers, the image processing apparatus comprising:
    a determining unit that determines whether objects included in different layers overlap each other in a single pixel constituting said print image; and
    a selecting unit that selects, from a plurality of different image processing, an image processing to be performed with respect to said single pixel according to a combination of attribute information for each of said layers assigned to said single pixel, when said determining unit determines that the objects overlap each other,
    wherein said layer is variable data that constitutes variable print data for generating a printed matter for a plurality of users, and
    said selecting unit selects image processing to be additionally performed with respect to said single pixel, based on said user's personal information extracted from an object included in said variable print data.

8. A non-transitory computer readable storage medium stored with a control program of an image processing apparatus that generates a print image based on print data including a plurality of layers, said program causing said image processing apparatus to execute a process comprising:
    a procedure (A) of determining whether objects included in said layers different from each other overlap each other in a single pixel constituting said print image; and
    a procedure (B) of when it is determined in said procedure (A) that the objects overlap each other, selecting, from a plurality of different image processing, an image processing to be performed with respect to said single pixel according to a combination of attribute information for each of said layers assigned to said single pixel,
    wherein said procedure (B) adjusts an intensity of the image processing to be performed with respect to said single pixel according to the number of overlapping of objects of said layers different from each other in said single pixel.

9. The non-transitory computer readable storage medium as claimed in claim 8, wherein the image processing to be performed with respect to said single pixel is screen processing performed in a print engine that outputs said print image.

10. The non-transitory computer readable storage medium as claimed in claim 9, wherein the screen processing performed in said print engine includes at least one of thinning, edge enhancement, and smoothing.

11. The non-transitory computer readable storage medium as claimed in claim 8, wherein said procedure (B) refers to priorities preset to each of said attribute information included in said combination, and selects, from the plurality of different image processing, the image processing to be performed with respect to said single pixel according to said attribute information having the highest priority.

12. The non-transitory computer readable storage medium as claimed in claim 8, wherein said procedure (B) selects the image processing to be performed with respect to said single pixel according to a combination of said attribute information corresponding to at least the uppermost one and a next one of said layers.

13. The non-transitory computer readable storage medium as claimed in claim 8, wherein said attribute information includes at least one of information indicating a type of said object, information indicating an edge attribute of said object, and a type of screen processing applied to said object.

14. A non-transitory computer readable storage medium stored with a control program of an image processing apparatus that generates a print image based on print data including a plurality of layers, said program causing said image processing apparatus to execute a process comprising:

a procedure (A) of determining whether objects included in said layers different from each other overlap each other in a single pixel constituting said print image; and a procedure (B) of when it is determined in said procedure (A) that the objects overlap each other, selecting, from a plurality of different image processing, an image processing to be performed with respect to said single pixel according to a combination of attribute information for each of said layers assigned to said single pixel, wherein said layer is variable data that constitutes variable print data for generating a printed matter for a plurality of users, and said procedure (B) selects image processing to be additionally performed with respect to said single pixel, based on said user's personal information extracted from an object included in said variable print data.

* * * * *